US009187141B2

(12) United States Patent
Kuo

(10) Patent No.: US 9,187,141 B2
(45) Date of Patent: Nov. 17, 2015

(54) CONTROL MECHANISM OF THE ADJUSTABLE SEAT POST FOR A BICYCLE

(71) Applicant: Taiwan Hodaka Industrial Co., Ltd., Taipei (TW)

(72) Inventor: Frank Kuo, Taipei (TW)

(73) Assignee: Taiwan Hodaka Industrial Co., Ltd., Taipei (TW)

( * ) Notice: Subject to any disclaimer, the term of this patent is extended or adjusted under 35 U.S.C. 154(b) by 17 days.

(21) Appl. No.: 14/246,183

(22) Filed: Apr. 7, 2014

(65) Prior Publication Data

US 2015/0284043 A1 Oct. 8, 2015

(51) Int. Cl.
*F16F 9/53* (2006.01)
*B62J 1/08* (2006.01)
*F16F 9/02* (2006.01)

(52) U.S. Cl.
CPC .............. *B62J 1/08* (2013.01); *B62J 2001/085* (2013.01); *B62K 2201/08* (2013.01); *F16F 9/0245* (2013.01)

(58) Field of Classification Search
USPC .................. 188/267.1, 267.2; 280/5.504, 276
See application file for complete search history.

(56) References Cited

U.S. PATENT DOCUMENTS

| | | | | |
|---|---|---|---|---|
| 2009/0324327 | A1* | 12/2009 | McAndrews et al. | 403/409.1 |
| 2013/0341138 | A1* | 12/2013 | Battlogg et al. | 188/267.1 |
| 2013/0341843 | A1* | 12/2013 | Battlogg et al. | 267/140.14 |
| 2015/0061241 | A1* | 3/2015 | Walthert et al. | 280/5.504 |

* cited by examiner

*Primary Examiner* — Christopher Schwartz
(74) *Attorney, Agent, or Firm* — Alan D. Kamrath; Kamrath IP Lawfirm, P.A.

(57) ABSTRACT

A control mechanism of the adjustable seat post for a bicycle is fixed to the bottom end of the lower outer tube of the seat post. The control mechanism is managed by a controlling wire to drive a pin within the seat post to move axially to adjust the position of the seat post supporting the seat, so that the controlling wire will not move up and down with the seat post for seat height adjustments. Thus, the control mechanism will not generate a residual wire occurring in a prior art seat height adjusting device. It is because the controlling wire of the prior art device is disposed to the top end of the seat post. Therefore, the drawback of a prior art device can be ameliorated by arranging the control mechanism to the bottom end of the lower outer tube of the seat post.

4 Claims, 4 Drawing Sheets

CONTROL MECHANISM OF THE ADJUSTABLE SEAT POST FOR A BICYCLE

BACKGROUND OF THE INVENTION

1. Field of the Invention

The present invention relates to a control mechanism of the adjustable seat post for a bicycle and, more particularly, to a control mechanism which is fixed to the bottom end of the lower outer tube of the seat post, and of which the controlling wire will not generate a residual wire when said controlling wire manages said control mechanism for seat height adjustments.

2. Description of the Prior Art

Generally, the seat post 1 of a bicycle is inserted into the seat tube of said bicycle. A prior art seat post 1, as shown in FIG. 1, is arranged with a lower outer tube 10 and an inner tube 11. The bottom end of said lower outer tube 10 is inserted into said seat tube to allow said lower outer tube 10 to be fixed to said seat tube. Moreover, the bottom end of said inner tube 11 is inserted into the interior of said lower outer tube 10. The top end of said inner tube 11 is secured to the seat of said bicycle. An oil hydraulic mechanism 12, a pin 13 and other members are arranged inside said inner tube 11 and between said lower outer tube 10 and said inner tube 11. Said pin 13 is disposed inside said oil hydraulic mechanism 12, and the top end thereof extends through said oil hydraulic mechanism 12 and positions at the top end of said inner tube. When the user manipulates the controlling wire 14 to drive a cam 15 to rotate to enable said pin 13 to axially move downward, said oil hydraulic mechanism 12 is in a state of releasing pressure. Thus, said inner tube 11 may move axially to adjust the seat height. One end of said controlling wire 14 is fixed to the top end of said inner tube 11. The seat height may be adjusted by axial movements of said inner tube 11, so that said controlling wire 14 may have a residual wire 14a resulting from downmovement, as shown in FIG. 2, when said inner tube 11 moves down. Therefore, it is inconvenient to use.

SUMMARY OF THE INVENTION

It is against the background and the drawbacks associated therewith that the present invention has been developed.

The object of the present invention is to provide a control mechanism of the adjustable seat post for a bicycle which not only generates no residual wire after the seat height is adjusted downwards but also involves an element of novelty.

The present invention includes a pull-down oil hydraulic unit, which is secured to the bottom end of the lower outer tube of a seat post and is used to drive a pin inside said seat post to axially move upwards. Said pull-down oil hydraulic unit comprises a body, a partition member, a pulling member and a lower pin. Said body is provided with a hollow chamber, of which the top end is arranged with an upper opening and the bottom end is arranged with a lower opening. Said partition member is secured inside said body to partition off the interior of the chamber within said body to form an inner section and an outer section. Moreover, the outer wall of the bottom end of said partition member is provided with a through-hole enabling the inner section and the outer section to communicate with each other. Said pulling member is arranged inside said inner section and may be controlled to move axially within said inner section. The bottom end of said pulling member is fastened to one end of a controlling wire. Moreover, the other end of said controlling wire passes through said lower opening of said chamber. The outer wall of the top end of said pulling member is provided with a raised rim, and the outer wall of said raised rim is configured with an upper sealing ring allowed to touch said partition member. The inner wall of said inner section is arranged with a lower sealing ring touching the outer wall of said pulling member, so that an inner oil chamber is formed among said partition member, said pulling member, said upper sealing ring and said lower sealing ring. Said inner oil chamber is communicated with said through-hole. Said lower pin is arranged inside said outer section and may move axially within said outer section. The top surface of said lower pin is configured with a protruded push-block which corresponds to the bottom end of a main pin inside said seat post through said upper opening of said body. An outer oil chamber is arranged between said lower pin and said partition member. Said pulling member may be pulled downwards by said controlling wire, so that said pulling member may move axially to push the oil within said inner oil chamber into said outer oil chamber through said through-hole. Thus, said lower pin is simultaneously driven to move upwards to enable said protruded push-block to move upwards to push said main pin to axially move upwards to direct said oil hydraulic mechanism inside said seat post to release pressures to adjust the seat height. Said pull-down oil hydraulic unit is fastened to the bottom end of the lower outer tube of the seat post. Hence said pull-down oil hydraulic unit will not generate a residual wire that occurs in a prior art seat height adjusting device after the seat height is adjusted.

BRIEF DESCRIPTION OF THE DRAWINGS

In order that the present invention may be more fully understood, preferred embodiments thereof will now be described with reference to the accompanying drawings, in which.

DESCRIPTION OF THE PREFERRED EMBODIMENTS

The means for achieving the aforesaid objective and the functions of the present invention will become apparent from the following description, taken in connection with the accompanying drawings, wherein preferred embodiments of the present invention are disclosed.

Figure 1:
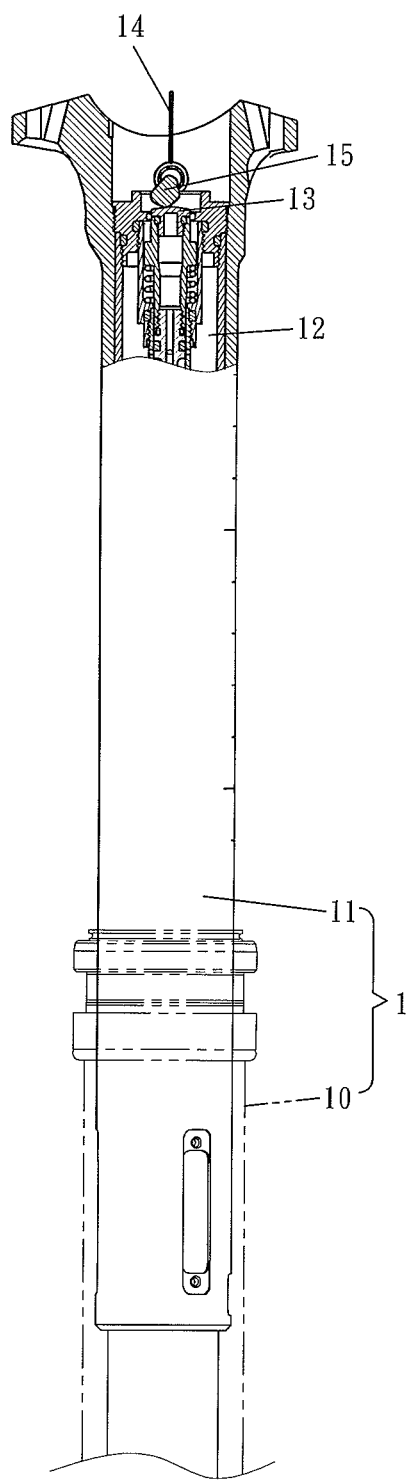
FIG. 1 is a sectional view of a prior art seat height adjusting device.
Figure 2:
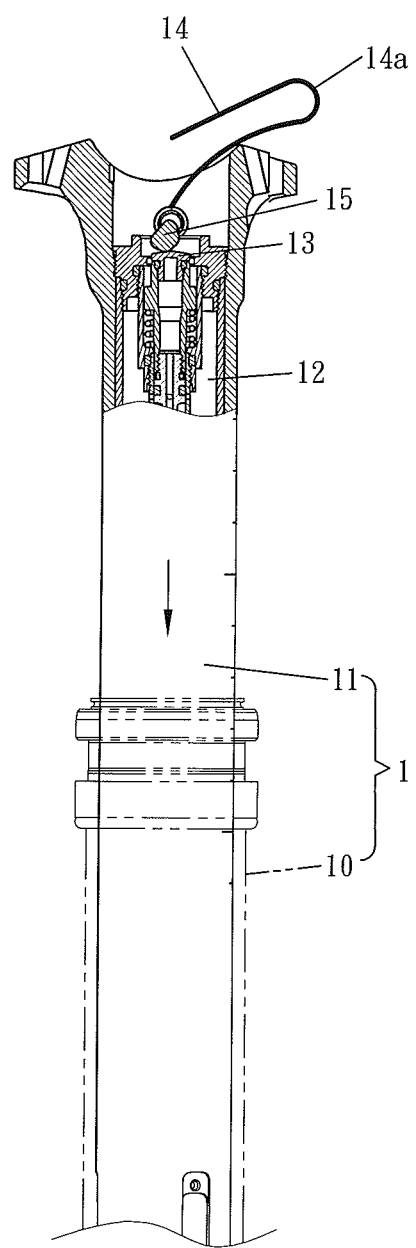
FIG. 2 is a schematic drawing showing a residual controlling wire occurring in a prior art seat height adjusting device after the seat is adjusted downwards.
Figure 3:
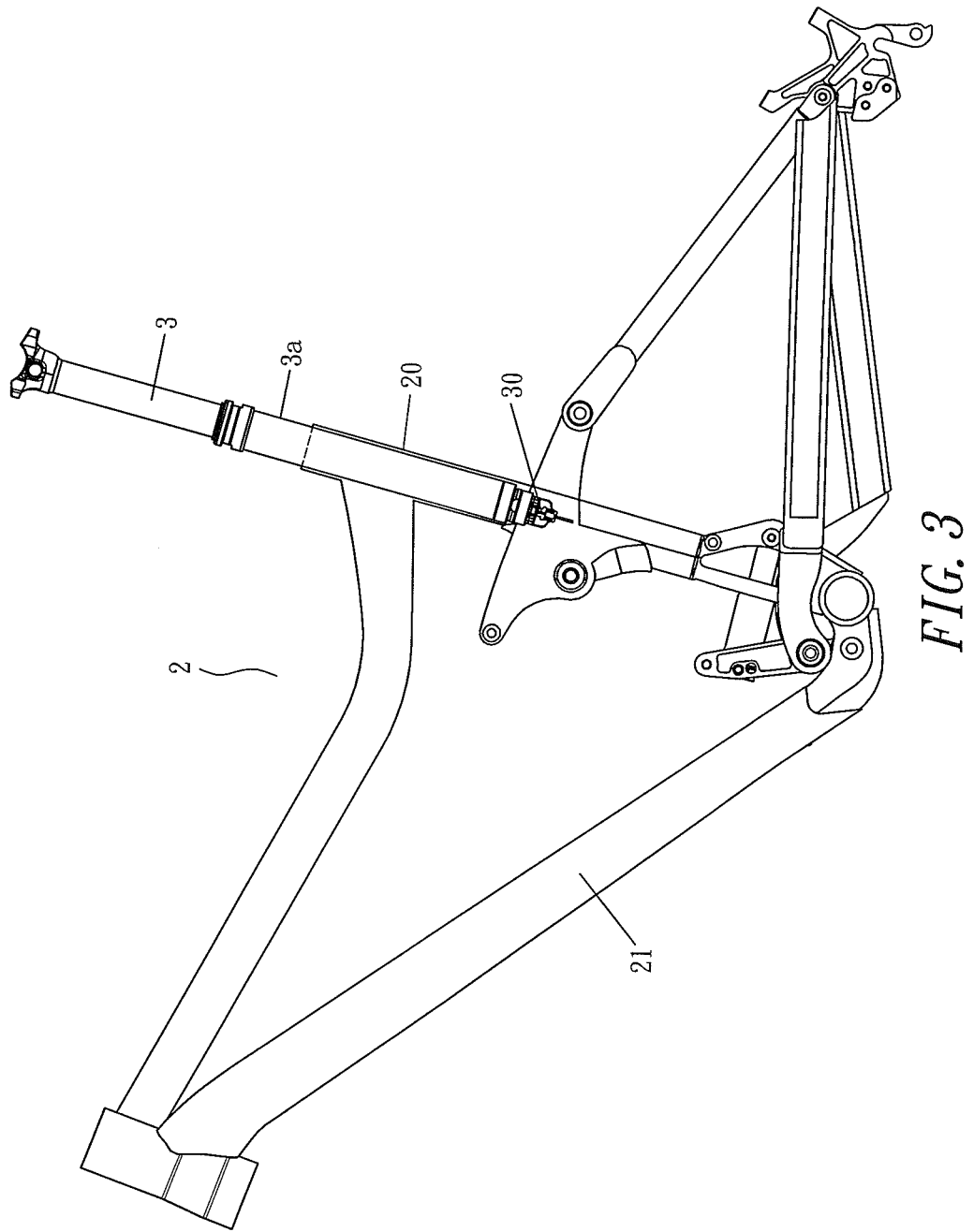
FIG. 3 is a drawing showing that the pull-down oil hydraulic unit is combined with the bicycle frame according to the preferred embodiment of the present invention.
Figure 4:
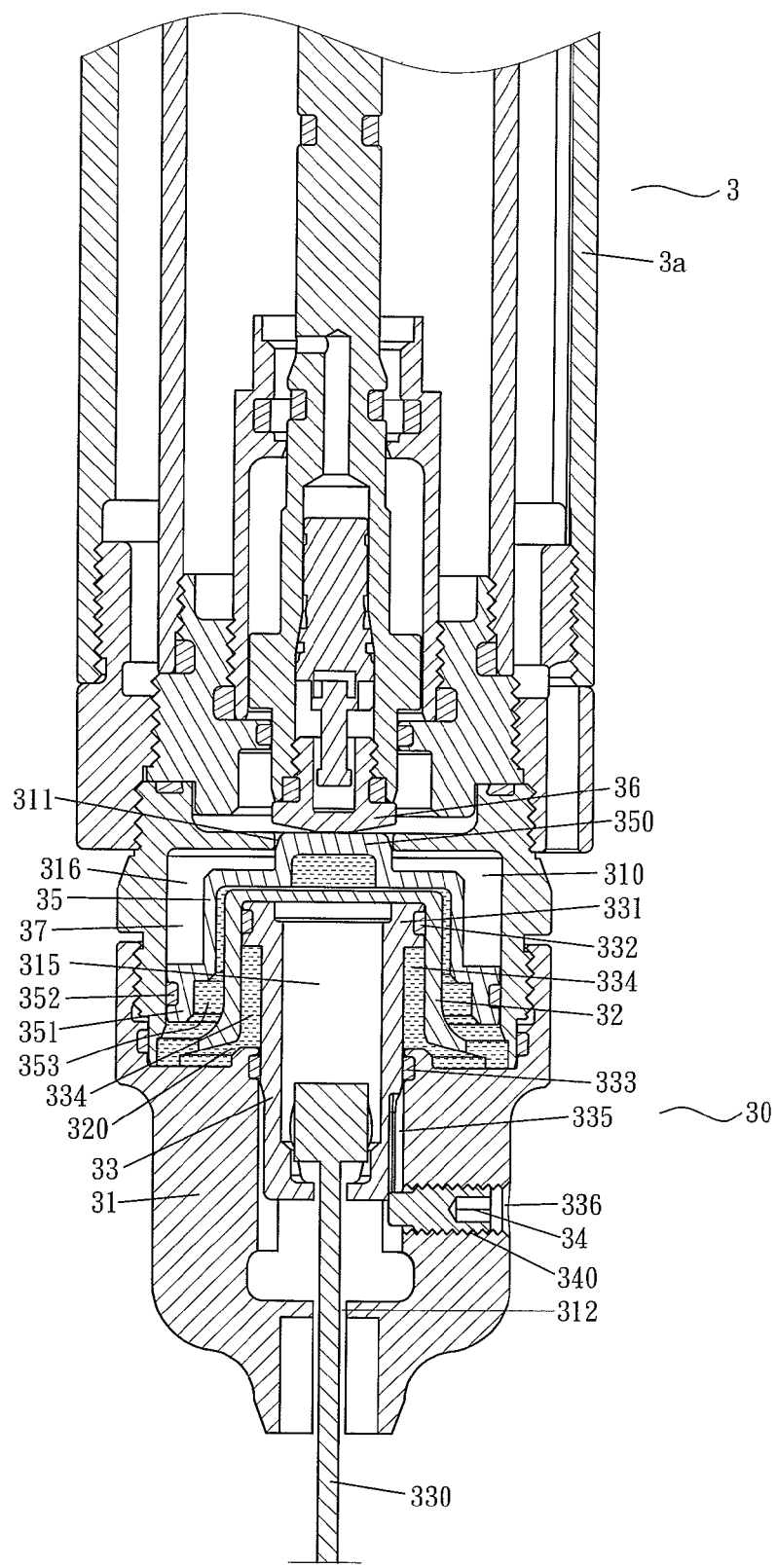
FIG. 4 is a sectional view showing that the pull-down oil hydraulic unit is fully assembled according to the preferred embodiment of the present invention.

Referring to FIG. 3 and FIG. 4, the control mechanism for managing the adjustment of the bicycle seat height disclosed in the present invention is a pull-down oil hydraulic unit 30, which is secured to the bottom end of the lower outer tube 3a of the seat post 3 arranged to the bicycle frame 2. Said lower outer tube 3a is allowed to be inserted into the seat tube 20 of the bicycle frame 2 to be fixed to each other. Said pull-down oil hydraulic unit 30 includes a body 31 which is provided with a hollow chamber 310. Said hollow chamber 310 has a top end arranged with an upper opening 311 and a bottom end arranged with a lower opening 312.

A partition member 32 is secured inside said body 31 and partitions off the interior of the chamber 310 within said body 31 to form an inner section 315 and an outer section 316. Moreover, the outer wall of the bottom end of said partition member 32 is provided with a through-hole 320 enabling the inner section 315 and the outer section 316 to communicate with each other.

A pulling member 33 is arranged inside said inner section 315 and is allowed to move axially within said inner section 315 when being pulled. Said pulling member 33 has a bottom end fastened to one end of a controlling wire 330 (such as a steel cable). The other end of said controlling wire 330 travels through said lower opening 312 to be combined with a wire-control device fixed to the bicycle handlebar. Moreover, said pulling member 33 is provided with a raised rim 331 on the outer wall of the top end thereof. The outer wall of said raised rim 331 is configured with an upper sealing ring 332 fixed to said outer wall of said raised rim 331 to allow said upper sealing ring 332 to touch said partition member 32. The inner wall of said inner section 315 is arranged with a lower sealing ring 333 which is inserted into said inner wall of said inner section 315 to allow said lower sealing ring 333 to touch the outer wall of said pulling member 33, so that an inner oil chamber 334 is formed among said partition member 32, said pulling member 33, said upper sealing ring 332 and said lower sealing ring 333. Said inner oil chamber 334 may communicate with said through-hole 320. In addition, said pulling member 33 is provided with a recessed section 335 on the outer wall of the bottom end thereof. The lower portion of said body 31 inner wall corresponding to said recessed section 335 on the bottom end of said pulling member 33 is provided with a radial threaded hole 336 allowing a screw 34 with external threads 340 to be screwed to. The tail end of said screw 34 is inserted into said recessed section 335 on the bottom end of said pulling member 33.

A lower pin 35 is arranged inside said outer section 316 to be allowed to move axially within said outer section 316. The top surface of said lower pin 35 is arranged with a protruded push-block 350, which is configured within said upper opening 311 of said partition member 32 and corresponds to the bottom end of a main pin 36 inside said seat post 3. Said oil hydraulic mechanism within said seat post 3 may release pressure to adjust the seat height when said main pin 36 is pushed to axially move upwards by said lower pin 35. An outer oil chamber 353 is arranged between said lower pin 35 and said partition member 32. The lower portion of said lower pin 35 outer wall is provided with a raised rim 351, of which the outer wall is disposed with a sealing ring 352 tightly touching the interior wall of said body 31. Moreover, the interior of said outer section 316 is provided with a sliding space 37 which allows said lower pin 35 to move axially.

After all of the aforementioned members are fully assembled, one end of said controlling wire 330 may be threaded into a down tube 21 via the bottom end of said seat tube 20, and may then be pulled outwards through the through-hole at the bottom end of said down tube 21 to be secured to the wire-control device fixed to the bicycle handlebar. Moreover, the loosening or tightening of said controlling wire 330 is managed by the wire-control device.

Figure 5:
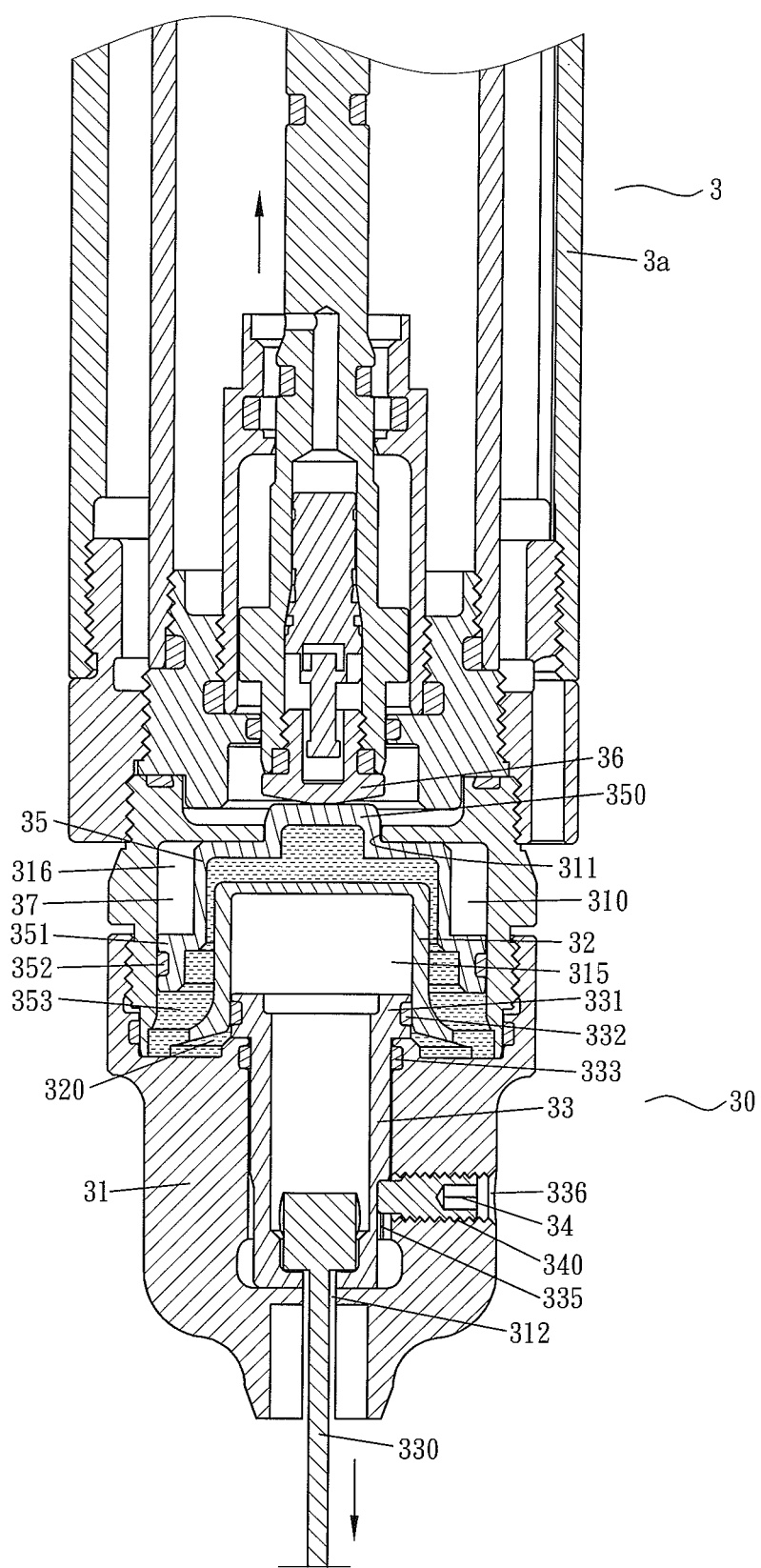
FIG. 5 is a structure diagram showing the pull-down oil hydraulic unit upward pushes the main pin according to the preferred embodiment of the present invention.

Referring to FIG. 4 and FIG. 5, the user may tighten the wire-control device to pull said controlling wire 330 to drive said pulling member 33 to move downward simultaneously to enable the oil within said inner oil chamber 334 to be squeezed to flow toward said outer oil chamber 353 via said through-hole 320. Thus, the pressure produced from said oil body may simultaneously push said lower pin 35 to axially move upward within said sliding space 37 to drive said protruded push-block 350 of said lower pin 35 to upward push said main pin 36, as shown in FIG. 5. Moreover, said main pin 36 may press the spring thereof simultaneously to direct said oil hydraulic mechanism within said seat post 3 to release pressure to adjust the seat height. In addition, the user may loosen the wire-control device to free said controlling wire 330, so that said main pin 36, said lower pin 35 and said pulling member 33 may be pushed back to home position by the spring force of said main pin 36. Thus, the seat height is fixed.

In addition, the inner wall of the top end of said recessed section 335 of said pulling member 33 may touch the tail end of said screw 34 to prevent said pulling member 33 from excessively moving downward when said controlling wire 330 is pulled to drive said pulling member 33 to move to a limit position.

Said pull-down oil hydraulic unit is fixed to the bottom end of the lower outer tube of the seat post, so that said pull-down oil hydraulic unit will not move when the seat height is adjusted. Therefore, the controlling wire disclosed in the present invention will not generate a residual wire that occurs in a prior art seat height adjusting device after the seat height is adjusted.

It will be appreciated by those skilled in the art that variations and modifications to the invention described herein will be apparent without departing from the spirit and scope thereof. The variations and modifications as would be apparent to persons skilled in the art are deemed to fall within the broad scope and ambit of the invention as herein set forth.

What is claimed is:

1. A control mechanism of an adjustable seat post for a bicycle is a pull-down oil hydraulic unit which is secured to a bottom end of a lower outer tube of a seat post; with said pull-down oil hydraulic unit comprising:
    a body which is provided with a hollow chamber, wherein said hollow chamber has a top end arranged with an upper opening and a bottom end arranged with a lower opening;
    a partition member which is secured inside said body and partitions off an interior of the hollow chamber of said body to form an inner oil chamber and an outer oil chamber, wherein an outer wall of a bottom end of said partition member is provided with a through-hole enabling the inner oil chamber and the outer oil chamber to communicate with each other;
    a pulling member which is arranged inside said inner oil chamber, moves axially within said inner oil chamber, and is fastened to one end of a controlling wire; wherein another end of said controlling wire passes through said lower opening; wherein an outer wall of a top end of said pulling member is provided with a raised rim, wherein an outer wall of said raised rim includes an upper sealing ring touching said partition member; wherein an inner wall of said inner oil chamber is arranged with a lower sealing ring which is inserted into said inner wall of said inner oil chamber to allow said lower sealing ring to touch the outer wall of said pulling member, wherein the inner oil chamber is formed among said partition member, said pulling member, said upper sealing ring and said lower sealing ring;
    a main pin within the seat post; and
    a lower pin which is arranged inside said outer oil chamber and is allowed to move axially within said outer oil chamber, wherein a top surface of said lower pin includes a protruded push-block which passes through said upper opening and corresponds to a bottom end of said main pin; wherein said main pin and said protruded push-block are arranged top-to-bottom, and wherein a lower portion of an outer wall of the lower pin is provided with a raised rim, wherein an outer wall of the raised rim is disposed with a sealing ring tightly touching an interior wall of said body, wherein the outer oil chamber is formed between said lower pin and said partition member; and wherein said outer oil chamber is communicated with said inner oil chamber via said through-hole, with the main pin moving axially to release pressure for seat height adjustments.

2. The control mechanism of the adjustable seat post for a bicycle as claimed in claim 1, wherein the outer wall of a bottom end of said pulling member is provided with a recessed section; wherein the lower portion of said interior wall of the body corresponds to said recessed section and has a radial threaded hole allowing a screw with external threads to be screwed to; and wherein a tail end of said screw is inserted into said recessed section on the bottom end of said pulling member.

3. The control mechanism of the adjustable seat post for a bicycle as claimed in claim 1, wherein said other end of said controlling wire passes through said lower opening and is threaded into a down tube via a bottom end of a seat tube, and wherein said other end of said controlling wire is pulled outwards through a through-hole at a bottom end of said down tube to be secured to a wire-control device fixed to a bicycle handlebar.

4. The control mechanism of the adjustable seat post for a bicycle as claimed in claim 2, wherein said other end of said controlling wire passes through said lower opening and is threaded into a down tube via a bottom end of a seat tube, and wherein said other end of said controlling wire is pulled outwards through a through-hole at a bottom end of said down tube to be secured to a wire-control device fixed to a bicycle handlebar.

* * * * *